Jan. 11, 1938.  W. A. READY  2,105,007

SHOVEL OR LIKE TOOL

Filed Dec. 4, 1935

Inventor:
William A. Ready,
Attys.

Patented Jan. 11, 1938

2,105,007

UNITED STATES PATENT OFFICE 2,105,007

SHOVEL OR LIKE TOOL

William A. Ready, Brookline, Mass., assignor to Ames Baldwin Wyoming Co., Parkersburg, W. Va., a corporation of Delaware Application December 4, 1935, Serial No. 52,863

4 Claims. (Cl. 294—49)

This invention relates to shovels or like tools having a blade and a handle-receiving element formed at least in part by a separate piece of metal having an end portion welded to the blade proper and in its more specific aspects to shovels of the types known as plain-back shovels and back-strap shovels wherein the separate piece has an enlarged head overlying an unbroken face of the blade to form a frog designed to receive the end of the handle. The object is to provide an improved construction of such tools facilitating their manufacture and providing a stronger article.

My invention will be well understood by reference to the following description taken in connection with the accompanying drawing, wherein by way of example I have shown my invention applied to a shovel of the back-strap type, and wherein:—

Figure 1:
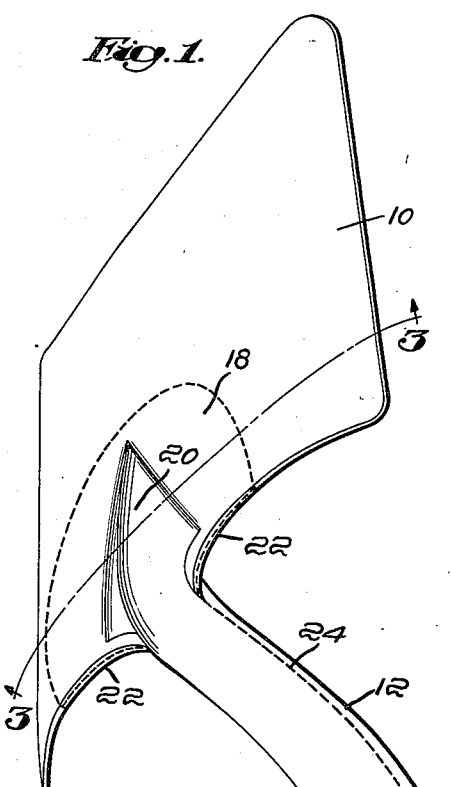
Fig. 1 is a perspective view of the shovel as seen from the rear.
Figure 2:
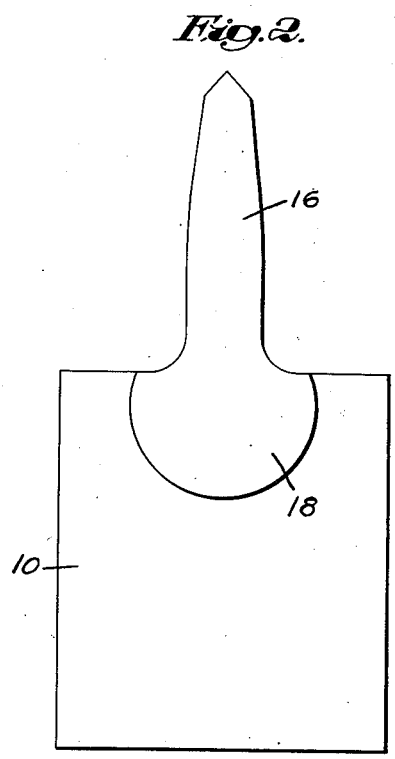
Fig. 2 is a rear plan of the shovel and strap prior to being formed into shape.
Figure 3:
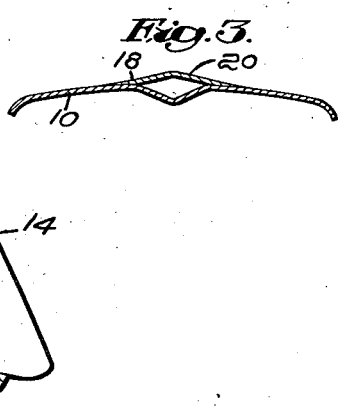
Fig. 3 is a section on the line 3—3 of Fig. 1 but on a smaller scale.

The tool herein shown is of the back-strap type and comprises a blade 10 having a front strap 12 extending from the rear edge thereof, the strap being either integral or effectively integral with the blade proper. In completing the shovel it will be understood that this strap 12 is curved in cross section to fit the wooden handle 14 and is given the desired profile to provide the proper lift to the shovel. The socket for receiving the handle is completed by means of a back strap comprising a strap or tongue proper 16 of suitable cross-sectional curvature and longitudinal profile to mate with and cooperate with strap 12 to form the socket and an enlarged head 18 which overlies the blade and is marginally welded thereto along its sides from the rear edge of the blade on one side of the center to the rear edge on the other. Herein the middle portion forms in cooperation with the overlying portion of the blade a frog 20 into which the end of the handle 14 projects in the usual manner. In the preferred form of the invention shown the head 18 of the back strap takes the shape of the major segment of a circle, the diameter of which is thus positioned forwardly of the rear edge of the blade 10.

Important advantages are obtained by welding the strap to the blade along a line curved throughout and more particularly, as herein, with the point of greatest width inwardly from the edge of the blade. When the tool is subjected to prying strains no part of the weld lies in a straight line which might be disposed transversely to the strain and tend to open in the manner of a hinge. Any line of bend intersects the line of the weld instead of being coincident with it. The lateral strain or twist on the shovel may be considered as caused by a force couple exerted centrally at the handle and at an edge. The connection inwardly from the rear edge and laterally remote from the handle acts with a favorable mechanical advantage to resist such strains.

The shovel may conveniently be formed from high carbon steel by the process more fully described in my companion application executed concurrently herewith, Serial No. 52,864, filed Dec. 4, 1935. In any instance, however, the weld around the arc of the head 18 is desirably effected by electric welding and the electrode and assembled shovel parts move relatively along the line of weld. The continuous curvature of the weld of the strap facilitates such movement, particularly when, as here, it is the arc of a circle of constant curvature since this permits the movement to be readily effected at a constant speed so that the welding operation is made easier and its results more uniform.

Preferably the shoulders of the enlarged head of the strap at 22 are welded to the back edge of the blade and the opposed edges of the straps 12 and 16 welded together at 24 to form an unbroken tubular socket as described in my Patent 1,989,063, Jan. 22, 1935. In Fig. 1 the various welded joints are indicated in conventional manner by dotted lines.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A shovel comprising a blade and a socket-forming portion having an enlarged head in the form of a major segment of a circle with the chord of the segment located substantially at the back edge of the blade, the segment being welded to the blade marginaly around the arc thereof.

2. A shovel comprising a blade and a socket-forming portion having an enlarged head marginally welded to the blade from the rear edge of the blade at one side of the center to the rear edge at the other side along a line curved throughout and having its greatest width disposed inwardly from the rear edge of the blade.

3. A shovel comprising a blade having a strap extending rearwardly therefrom and a cooperating strap having an enlarged head overlying the blade and defining a frog therewith, said head being in the form of a major segment of a circle with the chord of the segment located substantially at the back edge of the blade, the segment being welded to the blade marginally around the arc thereof.

4. A shovel comprising a blade having a strap extending rearwardly therefrom and a cooperating strap having an enlarged head overlying the blade from the rear edge of the blade at one side of the center to the rear edge at the other side and defining a frog therewith, said head being marginally welded to the blade along a line curved throughout and having its greatest width disposed inwardly from the rear edge of the blade.

WILLIAM A. READY.